(12) United States Patent
Clausen (10) Patent No.: US 10,260,977 B2
(45) Date of Patent: Apr. 16, 2019

(54) DIFFERENTIAL PRESSURE TRANSDUCER

(71) Applicant: Huba Control AG, Wuerenlos (CH)

(72) Inventor: Florian Clausen, Naters (CH)

(73) Assignee: HUBA CONTROL AG, Wuerenlos (CH)

( * ) Notice: Subject to any disclaimer, the term of this patent is extended or adjusted under 35 U.S.C. 154(b) by 63 days.

(21) Appl. No.: 15/612,330

(22) Filed: Jun. 2, 2017

(65) Prior Publication Data
US 2017/0363497 A1 Dec. 21, 2017

(30) Foreign Application Priority Data

Jun. 16, 2016 (EP) ..................................... 16174679

(51) Int. Cl.
*G01L 13/02* (2006.01)
*G01L 9/00* (2006.01)

(52) U.S. Cl.
CPC .......... *G01L 13/025* (2013.01); *G01L 9/0042* (2013.01); *G01L 9/0051* (2013.01); *G01L 9/0052* (2013.01)

(58) Field of Classification Search
None
See application file for complete search history.

(56) References Cited

U.S. PATENT DOCUMENTS

| | | | |
|---|---|---|---|
| 4,791,818 A | 12/1988 | Wilde | 73/861.24 |
| 5,177,661 A | 1/1993 | Zavracky et al. | 361/283.4 |
| 5,844,141 A | 12/1998 | Stansfeld | 73/702 |
| 7,290,453 B2 | 11/2007 | Brosh | 73/720 |
| 2005/0103114 A1 | 5/2005 | Bly et al. | 73/754 |
| 2008/0277486 A1* | 11/2008 | Seem | H04L 67/125 236/49.3 |

(Continued)

FOREIGN PATENT DOCUMENTS

| | | | |
|---|---|---|---|
| EP | 1953516 A1 | 8/2008 | ............. B01D 65/10 |
| WO | 95/03532 A1 | 2/1995 | ............. G01D 3/036 |

OTHER PUBLICATIONS

Partial European Search Report, Application No. 16174679.7, 9 pages, dated Jan. 2, 2017.

(Continued)

*Primary Examiner* — Clayton E. LaBalle
*Assistant Examiner* — Dennis Hancock
(74) *Attorney, Agent, or Firm* — Slayden Grubert Beard PLLC (57) ABSTRACT

The present disclosure relates to differential pressure transducers. The teachings thereof may be embodied in diaphragm-beam configurations for measuring small values of differential pressure and/or a bridge circuit for converting mechanical strains into an electric output signal. For example, a diaphragm-beam structure for measuring differential pressure may include: a frame; a paddle; a resilient beam member; a diaphragm; and a gap defined between the paddle and the frame. The diaphragm flexes under pressure on one surface. The resilient beam member anchors the paddle to the frame. The second surface of the diaphragm is mounted to the first surface of the paddle and the frame to bridge the gap. The paddle moves due to flexure of the diaphragm. The resilient beam member bends due to movement of the paddle. The thickness of the diaphragm is less than 50 micrometers.

15 Claims, 2 Drawing Sheets

(56) References Cited

U.S. PATENT DOCUMENTS

| | | | | |
|---|---|---|---|---|
| 2009/0120195 A1* | 5/2009 | Willcox | ............ | G01F 1/383 |
| | | | | 73/718 |
| 2011/0005323 A1 | 1/2011 | Enomoto et al. | ............ | 73/718 |
| 2014/0319628 A1 | 10/2014 | Nakane et al. | ............ | 257/415 |
| 2015/0241291 A1* | 8/2015 | Riou | ............ | G01L 9/0019 |
| | | | | 73/702 |
| 2017/0211853 A1* | 7/2017 | Feng | ............ | F25B 13/00 |

OTHER PUBLICATIONS

Extended European Search Report, Application No. 16174679.7, 16 pages, dated Apr. 18, 2017.

* cited by examiner

DIFFERENTIAL PRESSURE TRANSDUCER

CROSS-REFERENCE TO RELATED APPLICATIONS

This application claims priority to EP Application No. 16174679.7 filed Jun. 16, 2016, the contents of which are hereby incorporated by reference in their entirety.

TECHNICAL FIELD

The present disclosure relates to differential pressure transducers. The teachings thereof may be embodied in, diaphragm-beam configurations for measuring small values of differential pressure and/or a bridge circuit for converting mechanical strains into an electric output signal.

BACKGROUND

Strain gauge beams are commonly employed to measure differential pressure. The U.S. Pat. No. 4,791,818 issued on 20 Dec. 1988 discloses a differential pressure transducer with a cantilever beam 30. The sensor of U.S. Pat. No. 4,791,818 comprises a strain gauge beam 46 arranged inside a sensor body 36. An electric sensor 49 such as a piezoelectric ceramic element is affixed to the surface of the strain gauge beam 46. The arrangement employs wires 53, 54 to transmit the electric signal out of the sensor body 36. A measurement of differential pressure in accordance with U.S. Pat. No. 4,791,818 is potentially influenced by the orientation of the cantilever beam sensor 30.

The U.S. Pat. No. 5,844,141 issued on 1 Dec. 1998. U.S. Pat. No. 5,844,141 teaches a sensor 10 with two silicon layers 11a, 11b enclosing a central layer 12. The central layer 12 has two beams 16. The beams 16 of U.S. Pat. No. 5,844,141 form a resonantly vibratable stress-sensitive member. The twin vibratable beams 16 connect via electrically conductive channels 23 to an electric driving signal. The arrangement determines changes in pressure from changes in the resonant frequency of the vibratable beams 16. The resonant frequency of the beams 16 of U.S. Pat. No. 5,844,141 is influenced by ambient factors such as temperature. The sensor of U.S. Pat. No. 5,844,141 thus employs a vibratable fork 20 to compensate for changes in temperature.

The U.S. Pat. No. 7,290,453B2 issued on 6 Nov. 2007. U.S. Pat. No. 7,290,453B2 discloses a pressure sensor assembly with piezo-resistive strain gauges 13 disposed on a force sensing beam. The piezo-resistive strain gauges 13, 14 of U.S. Pat. No. 7,290,453B2 electrically connect to a Wheatstone bridge. The Wheatstone bridge magnifies the conversion of forces into electric signals. The U.S. Pat. No. 7,290,453B2 acknowledges that thin diaphragms exhibit shortcomings. The specification teaches an integral diaphragm-beam and diaphragm-diaphragm approach to obviate problems related to thin diaphragms.

SUMMARY

Diaphragm-beam configurations are inherently prone to hysteresis. That is, a diaphragm flexes when a pressure is applied to the diaphragm. As the pressure lowers, the diaphragm would ideally return to its previous position. In an actual arrangement, the diaphragm does not fully return to its previous position. The teachings of the present disclosure may avoid the hysteresis and/or other considerations related to known differential pressure transducers with diaphragm-beam configurations. For example, the teachings may be embodied in a sensor operable to generate a signal indicative of small values of differential pressure.

Some embodiments may include a diaphragm-beam structure (1) for measuring differential pressure, the diaphragm-beam structure (1) comprising: a frame (2), at least a paddle (3) configured to move from a first position to a second position, at least a resilient beam member (4), a diaphragm (9) with a first surface and with a second surface opposite the first surface of the diaphragm (9), wherein the diaphragm (9) is configured to flex under application of a pressure on the first surface of the diaphragm (9), wherein a gap (5) is interposed between the at least a paddle (3) and the frame (2) and wherein the at least a resilient beam member (4) anchors the at least a paddle (3) to the frame (2), wherein the frame (2), the at least a paddle (3), and the at least a resilient beam member (4) each provide a first surface and wherein the at least a paddle (3) provides a second surface opposite its first surface, wherein the second surface of the diaphragm (9) is mounted to the first surface of the at least a paddle (3) and is flush mounted to at least a portion of the first surface of the frame (2) such that the diaphragm (9) bridges the gap (5) between the at least a paddle (3) and the frame (2), wherein the at least a paddle (3) is configured to move from the first position of the at least a paddle (3) to the second position of the at least a paddle (3) due to said flexure of the diaphragm (9) and under application of a pressure on the second surface of the at least a paddle (3), wherein the at least a resilient beam member (4) is configured to bend due to said movement of the at least a paddle (3) thereby generating a strain within the at least a resilient beam member (4), wherein the thickness of the diaphragm (9) between its first surface and its second surface is less than 50 micrometers.

In some embodiments, the thickness of the diaphragm (9) between its first surface and its second surface is less than 30 micrometers.

In some embodiments, the diaphragm (9) is made of a polymeric material.

In some embodiments, the diaphragm (9) contains polymers selected from the group of polyurethanes.

In some embodiments, the thickness of the at least a paddle (3) between its first surface and its second surface is less than 250 micrometers.

In some embodiments, the frame (2) comprises a second surface opposite its first surface and wherein the thickness between the first surface of the frame (2) and the second surface of the frame (2) is the same as the thickness between the first surface of the at least a paddle (3) and the second surface of the at least a paddle (3).

In some embodiments, the at least a resilient beam member (4) comprises a second surface opposite its first surface and wherein the thickness between the first surface of the at least a beam member (4) and the second surface of the at least a beam member (4) is the same as the thickness between the first surface of the at least a paddle (3) and the second surface of the at least a paddle (3).

In some embodiments, the diaphragm-beam structure (1) further comprises at least a strain gauge (7a-7d) and wherein the at least a strain gauge (7a-7d) is diffused into and/or implanted into, and/or affixed to the at least a beam member (4) such that the at least a strain gauge (7a-7d) is configured to convert strain within the resilient beam member (4) into an output signal (11) of the strain gauge (7a-7d).

In some embodiments, the diaphragm-beam structure (1) further comprises at least two bonding wires and wherein each of the at least two bonding wires connects to the at least a strain gauge (7a-7d).

In some embodiments, the diaphragm (9) comprises a portion with a bulge and wherein said portion with the bulge is disposed along the gap (5).

In some embodiments, the first surface of the at least a paddle (3) is circular.

In some embodiments, the at least a paddle (3) has a diameter along its first surface and wherein said diameter is less than 25 millimeters.

Some embodiments may include a pressure transducer comprising a housing (12) with first port (13a) and with a second port (13b), a first chamber (14a) inside the housing (12), a second chamber (14b) inside the housing (12), the pressure transducer further comprising at least a diaphragm-beam structure (1) as described above, wherein the first chamber (14a) is in fluid communication with the first port (13a), wherein the second chamber (14b) is in fluid communication with the second port (13b), wherein the at least a sensor element (1) is disposed inside the housing (12) between the first chamber (14a) and the second chamber (14b), and wherein the at least a diaphragm-beam structure (1) is configured to generate a signal indicative of a differential pressure between a fluid inside the first chamber (14a) and a fluid inside the second chamber (14b).

Some embodiments may include a circuit for heating, cooling, air-conditioning and/or ventilation with at least a pressure transducer as described above. In some embodiments, the circuit is a variable air volume system.

BRIEF DESCRIPTION OF THE DRAWINGS

Various features will become apparent to those skilled in the art from the following detailed description of the disclosed non-limiting embodiments. The drawing that accompanies the detailed description can be briefly described as follows.

DETAILED DESCRIPTION

The instant disclosure details a differential pressure transducer with a diaphragm-beam configuration. In some embodiments, the diaphragm-beam configuration comprises a thin diaphragm made of a polymeric material. The diaphragm is less than 50 micrometers in thickness. Due to the advent of new materials, the use of diaphragms with thicknesses below 50 micrometers in pressure transducers is now technically feasible. The diaphragm of the sensor element covers a cantilevered beam. As the diaphragm flexes, the diaphragm deflects the cantilevered beam. Strain gauges are diffused, implanted, and/or affixed to the beam. The strain gauges convert strains within the beam into (electric) signals.

In some embodiments, the diaphragm of the sensor element divides the sensor into a first chamber and into a second chamber. The differential pressure transducer of the instant disclosure comprises a first port and a second port. Each of the ports is in fluid communication with a flow path. The first port is in fluid communication with the first chamber of the transducer. The second port is in fluid communication with the second chamber of the transducer. The cantilevered beam provides a resilient element that bends in response to the pressure difference between the first chamber and the second chamber.

The problems with common systems are resolved by a sensor element and by a differential pressure transducer in accordance with the teachings of this disclosure. Various embodiments of the present disclosure are described in more detail below.

In some embodiments, there is a diaphragm-beam configuration and/or a differential pressure transducer with minimum hysteresis. In some embodiments, a diaphragm-beam configuration and/or a differential pressure transducer may be accurate (essentially) regardless of its orientation. Finally, some embodiments may include a diaphragm-beam configuration and/or a differential pressure transducer that is (essentially) independent of temperature. The teachings of the instant disclosure may miniaturize diaphragm-beam configurations and differential pressure transducers, provide a diaphragm-beam configuration and/or a differential pressure transducer that is sensitive to small differential pressures, provide a diaphragm-beam configuration and/or a differential pressure transducer that consumes less electric power than comparable hot wire flow meters.

Some embodiments may include a circuit for heating, cooling, air-conditioning and/or ventilation that comprises a differential pressure transducer and/or a diaphragm-beam configuration in accordance with the instant disclosure. For example, a circuit for heating, cooling, air-conditioning and/or ventilation may comprise a differential pressure transducer and/or a diaphragm-beam configuration in accordance with the instant disclosure, wherein the circuit is a variable air volume system.

The diaphragm-beam structure of the instant disclosure may form the sensor element of a differential pressure transducer. The differential pressure transducer may include a housing with at least two ports. These ports each connect to conduits. The differential pressure transducer disclosed herein is operable to determine differential pressure between the two ports.

Figure 1:
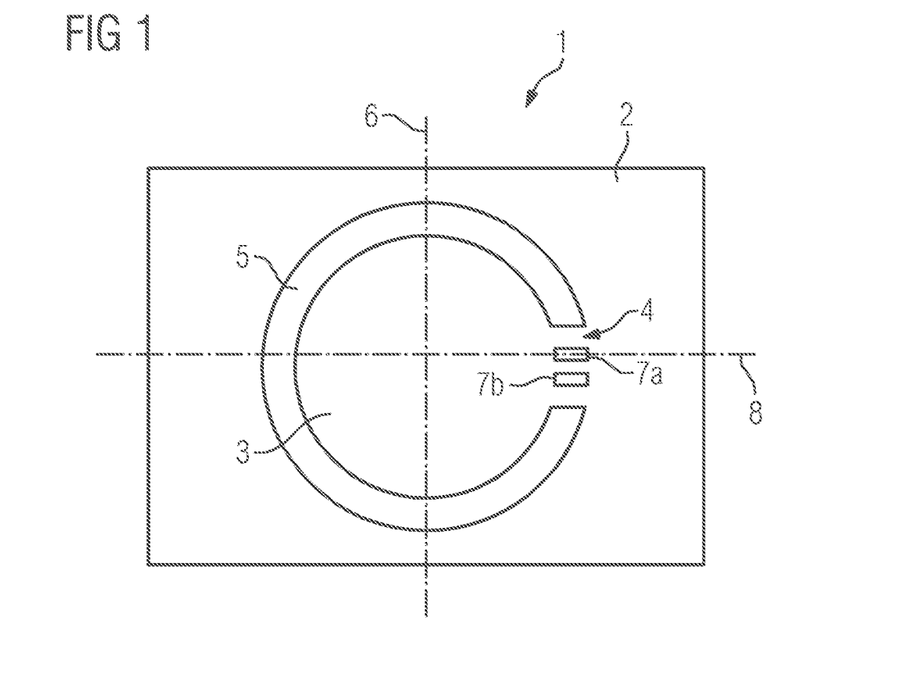
FIG. 1 is a plan view of a diaphragm-beam structure according to the instant disclosure.

FIG. 1 shows a diaphragm-beam structure 1 for a sensor element according to the teachings of the present disclosure. The diaphragm-beam structure 1 comprises a frame 2 and a cantilevered beam in the form of a paddle 3. The paddle 3 is anchored to the frame 2 via a beam member 4. In some embodiments, the paddle 3 and the beam member 4 are integral with the frame 2. They may be made of the same material, e.g., a ceramics material. The paddle 3, the beam member 4, and the frame 2 may comprise aluminum oxide ceramics (Al2O3). In some embodiments, the paddle 3, the beam member 4, and the frame 2 all comprise aluminum oxide ceramics with more than 92% purity. In some embodiments, they comprise aluminum oxide with 96% purity. In some embodiments, they comprise aluminum oxide with purity above 99%. Higher levels of purity may offer benefits in terms of mechanical tightness, mechanical brittleness, and dielectric strength.

In some embodiments, an arcuate gap 5 separates the paddle 3 from the frame 2. The circular portion of the gas-filled gap 5 largely encircles the paddle 3. The two ends of the gas-filled gap 5 point towards the beam member 4. In some embodiments, the arcuate gap 5 is filled with air. The gap 5 can, by way of example, also be filled with nitrogen and/or with helium and/or with an inert gas. The gap 5 can be filled with any suitable (gaseous) fluid.

The paddle 3 as shown on FIG. 1 is essentially cylindrical. In some embodiments, the cross-section of the paddle 3 is quadratic, rectangular, or triangular. The paddle 3 may take on any suitable shape chosen. The shape of the gas-filled gap 5 varies accordingly. In some embodiments, the paddle 3 is less than 500 micrometers thick. In some embodiments, the paddle 3 is less than 250 micrometers thick. In some embodiments, the paddle 3 is less than 150 micrometers or even less than 100 micrometers thick. In some embodiments, the paddle 3 is 120 micrometers thick.

Differential pressure transducers with thin paddles 3 may offer benefits in terms of sensitivity, since thin paddles 3 deflect further as a function of differential pressure. Also, thin paddles 3 may help overcome shortcomings due to g-forces. In some embodiments, the thickness of the beam member 4 is the same as the thickness of the paddle 3.

In some embodiments, the lateral width of the arcuate gap 5 is at least thickness of the paddle 3. In some embodiments, the width of the gap 5 is twice the thickness of the paddle 3. In some embodiments, the thickness of the gap 5 is at least five times the thickness of the paddle 3. In some embodiments, the thickness of the paddle 3 is more than ten times the thickness of the paddle 3. Wide gaps 5 reduce the likelihood of mechanical contact between the paddle 3 and the frame 2. Wide gaps 5 thus yield a lower risk of blockage between a paddle 3 and a frame 2.

The length of the paddle 3 along a cross-section taken along the line 6 may be less than 25 millimeters. In some embodiments, the length of the paddle 3 is less than 20 millimeters. In some embodiments, the length of the paddle is less than 15 millimeters or even less than 10 millimeters.

Small paddles 3 allow for miniaturization of the differential pressure transducer. A paddle 3 less than 150 micrometers thick and with lateral dimensions of less than 15 millimeters allows for a transducer with sensitivity to differential pressures below 3 millibars. Small paddles 3 and small diaphragm-beam structures 1 also allow for compact differential pressure transducers. A paddle 3 with lateral dimensions of less than 15 millimeters can be built into a frame 2 with lateral dimensions of 20 millimeters. This length of the frame 2 and the length of the paddle 3 are both measured along the same line 6. Accordingly, the size of a differential pressure transducer in the direction of line 6 needs not exceed 23 millimeters.

FIG. 1 also shows two strain gauges 7a, 7b diffused into, implanted into, and/or affixed to the resilient beam member 4. The strain gauges 7a, 7b may comprise resistors and/or capacitors. In some embodiments, the strain gauges 7a, 7b include piezoelectric elements. In some embodiments, the strain gauges 7a, 7b include fibre optic strain sensors such as Bragg sensors.

The piezoelectric elements 7a, 7b connect to a current supply via suitable bonding wires. No bonding wires are shown on FIG. 1. Bonding wires may connect the piezoelectric elements 7a, 7b to one another. The bonding wires are diffused into, implanted into, and/or affixed to the frame 2 and the beam member 4.

The piezoelectric elements 7a, 7b may include surface-mounted devices. Surface-mounted technology may provide reduction in size and in weight as well as lower profile. These may be particularly relevant to miniaturized pressure transducers. In addition, the use of surface-mounted components generally lowers manufacturing costs by allowing the use of highly automated equipment in assembly.

In some embodiments, the optical strain gauges 7a, 7b connect via optical fibres. The fibres are diffused into, implanted into, and/or affixed to the frame 2 and the beam member 4. Optical fibres and optical strain gauges may offer advantages in hazardous environments.

Figure 2:
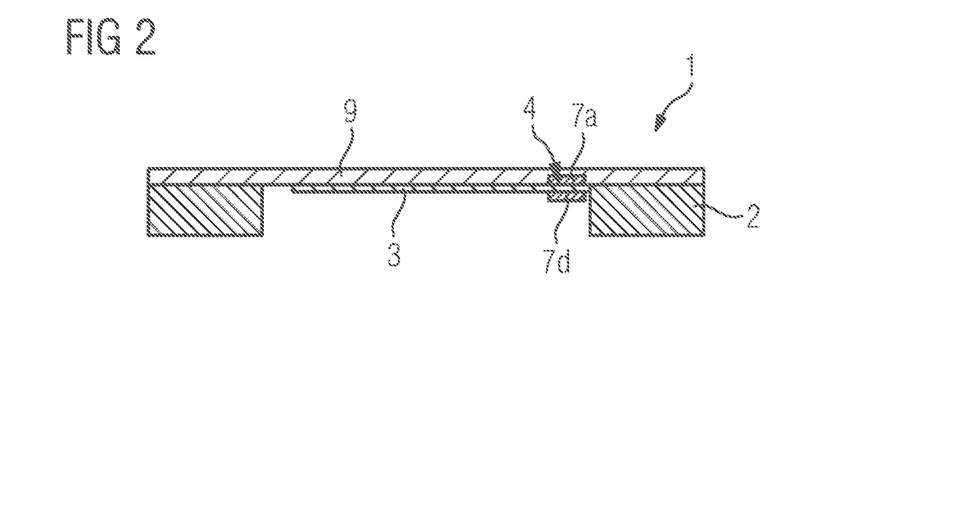
FIG. 2 is a cross-section view of a diaphragm-beam structure according to the instant disclosure.

FIG. 2 depicts is a cross-section view taken along line 8 of FIG. 1. The frame 2 as shown on FIG. 2 is thicker than the paddle 3. The frame 2 as shown on FIG. 2 is also thicker than the resilient beam member 4. In some embodiments, the frame 2, the paddle 3, and the beam member 4 all have the same thickness or substantially the same thickness.

A frame 2 may have sufficient thickness to reliably anchor the cantilevered beam. In some embodiments, the frame 2 is between 0.8 millimeters and 2.0 millimeters thick. In some embodiments, the thickness of the frame 2 lies between 1.0 millimeters and 1.4 millimeters. In some embodiments, the frame 2 is less than 500 micrometers thick. In some embodiments, the frame 2 is less than 250 micrometers thick. In some embodiments, the frame 2 is less than 150 micrometers or even less than 100 micrometers thick. In some embodiments, the frame 2 is 120 micrometers thick.

The frame 2, the paddle 3, and the beam 4 of the sensor element may each provide a first side. A diaphragm 9 covers one side of the paddle 3 and one side of the beam 4. The diaphragm 9 also covers one side of the (gas-filled) gap 5. The opposite side of the gap 5 is not covered by the diaphragm 9.

The diaphragm 9 also covers a portion of or all of the first side of the frame 2. The diaphragm 9 may cover a strip that (largely) encircles the gap 5. The diaphragm 9 may extend from the paddle 3 less than 2 millimeters beyond the gas-filled gap 5. The diaphragm 9 may extend less than 1.5 millimeters beyond the gas-filled gap 5. The diaphragm 9 still may extend 1.0 millimeter or less beyond the (gas-filled) gap 5. Diaphragms 8 with small diameters may yield benefits in terms of compact sensor elements.

The diaphragm 9 provides a first and a second side. In some embodiments, at least one surface of the diaphragm 9 is adhesive. The adhesive surface of the diaphragm 9 points toward the frame 2, toward the paddle 3, toward the beam 4, and toward the arcuate gap 5. An adhesive side of the diaphragm 9 allows for fixation of the diaphragm 9 to the frame 2, to the resilient beam member 4, and to the paddle 2. In some embodiments, the diaphragm 9 has no adhesive side.

In some embodiments, the diaphragm 9 is less than 50 micrometers in thickness. The diaphragm 9 may be less than 30 micrometers in thickness. In some embodiments, the diaphragm is less than 15 micrometers thick. The diaphragm 9 can be, e.g., 7 micrometers or 10 micrometers or 12 micrometers thick. Thin diaphragms 9 may flex more easily under the influence of a differential pressure.

The diaphragm 9 may comprise a polymeric material. The diaphragm 9 may, in particular, contain polymers selected from the group of polyurethanes, e.g. , those in use for medical applications. In some embodiments, the diaphragm 9 provides a (circular) portion with a bulge. The bulge or a portion of the bulge is disposed along the gap 5 in order that the diaphragm 9 does not hinder deflections of the paddle 3. The width of the gap 5 as well as maximum deflections of the paddle 3 and may determine suitable dimensions for the bulge. The bulge may stand less than 600 micrometers from (a plane defined by) the first surface of the paddle 3. The bulge may stand less than 500 micrometers from (a plane defined by) the first surface of the paddle 3. The bulge may stand approximately 300 micrometers from (a plane defined by) the first surface of the paddle 3.

The beam member 4 as depicted on FIG. 2 has a first side and a second side. The embodiment of FIG. 2 has strain gauges 7a, 7d on either side of the beam member 4. In some embodiments, the two strain gauges are diffused into, implanted into, and/or affixed to the first and on the second side beam member 4. With four strain gauges 7a-7d, the strain gauges 7a-7d may comprise a Wheatstone bridge. This type of circuit is shown on FIG. 3.

Figure 3:
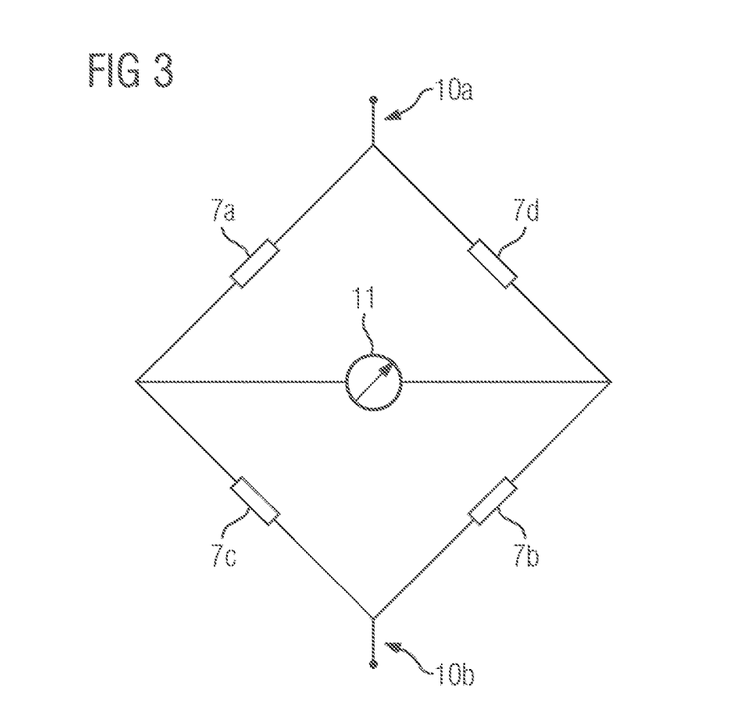
FIG. 3 is a schematic of a bridge circuit made up of strain gauges.

According to this embodiment, the strain gauges 7a and 7b are diffused into, implanted into, and/or affixed to a first side of the beam member 4. The strain gauges 7c and 7d are diffused into, implanted into, and/or affixed to a second side of the beam member 4. As the beam 4 member bends, the strain gauges on one side increase in length while the strain gauges on the opposite side shorten. With (piezoelectric) resistors as strain gauges, the resistivity of the (piezoelectric) resistors on the first side of the beam member 4 increases. The resistivity of the (piezoelectric) resistors on the second side of the beam member 4 decreases accordingly.

A voltage applied to the terminals 10a, 10b of the circuit yields an electric output signal 11. The electric output signal 11 is proportional to the strain within the bending beam 4, which is proportional to the differential pressure. The arrangement of the strain gauges 7a-7d in the form of a Wheatstone bridge improves on accuracy.

Some embodiments include an amplifier to adjust the magnitude of the electric output signal 11. Operational amplifier and/or (field effect) transistors are, by way of non-limiting example, suitable amplifiers. In some embodiments, the skilled person modifies the Wheatstone bridge into Carey Foster bridge.

In some embodiments, oversampling technique is employed such as the technique introduced in col 4, l 29-37, of the patent U.S. Pat. No. 9,148,163B2. The use of oversampling may, for instance, improve on the signal to noise ratio of the electric output signal 11. The measurement bridge may also connect to the sensor input 2 of the signal processing circuit shown on FIG. 1 of U.S. Pat. No. 9,148,163B2. According to another embodiment, a microcontroller 4 with an integrated analog-to-digital converter 9 as taught by U.S. Pat. No. 9,148,163B2, claim 1, is employed for analog-to-digital conversion.

In some embodiments, the differential pressure sensor also provides a temperature probe. The temperature probe may be arranged near the resistors 7a-7d. Suitable temperature probe may include without limitation, a PT100 resistor, PT1000 resistor, a NI1000 resistor, or similar. A temperature probe inside the differential pressure sensor may compensate for changes in temperature.

Figure 4:
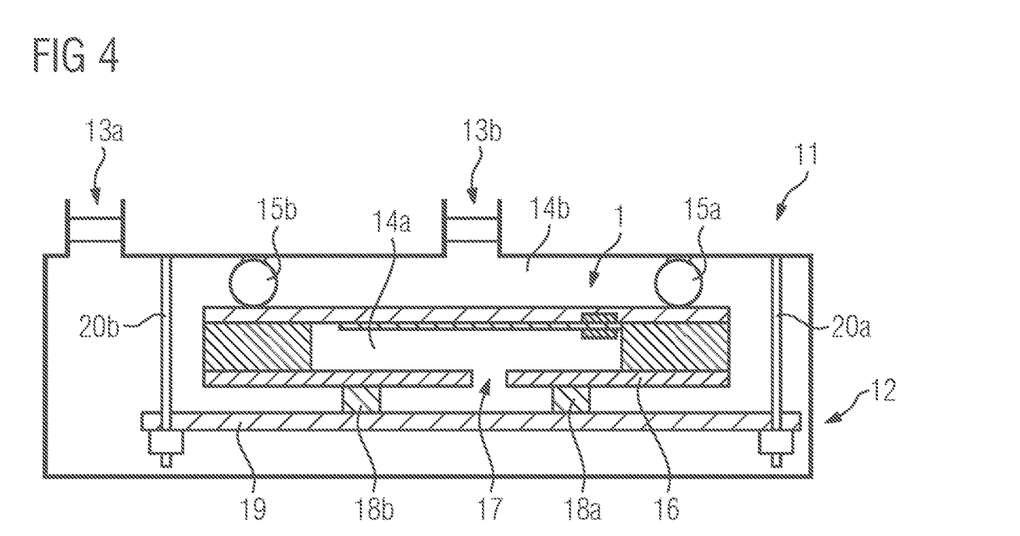
FIG. 4 is a cross-section view of a differential pressure transducer according to the instant disclosure.

FIG. 4 depicts a differential pressure transducer 11 with a diaphragm-beam structure 1 according to the instant disclosure. The diaphragm-beam structure 1 is disposed inside the housing 12 of the differential pressure sensor 11. The housing 12 comprises two ports 13a, 13b. The two ports 13a, 13b each connect to conduits that are in fluid communication with separate chambers 14a, 14b inside the housing 12. The ports 13a, 13b allow gaseous fluids such as air into their respective chambers 14a, 14b. A measurement of differential pressure is carried out between the two chambers 14a, 14b by means of the diaphragm-beam structure 1.

In some embodiments, a filter element is arranged inside at least one of the ports 13a, 13b. In some embodiments, the filter elements are arranged inside each of the two ports 13a, 13b. A filter element inhibits ingress of moisture and/or of particles into the housing 12. The filter element thereby protects the thin diaphragm from effects due to moisture and/or due to particulate matter. The filter element may inhibit ingress of particulate matter with characteristic dimensions of 2.5 micrometers and/or of 10 micrometers.

A gasket 15a, 15b may be interposed between the diaphragm of the sensor element 1 and the housing 12. The gasket 15a, 15b may be sufficiently impermeable to (gaseous) fluids and separates the two chambers 14a, 14b inside the housing 12. The gasket 15a, 15b may be annular. In some embodiments, the gasket 15 comprises an O-ring. In some embodiments, the housing 12 provides an (annular) protrusion or a groove, such as an annular groove, to fixate the gasket 15a, 15b. The groove may be integral with the housing 12.

A material impermeable to desired fluids may be used for the gasket 15a, 15b. A gasket material may be chosen to be compatible with the (gaseous) fluid inside the differential pressure transducer. In some embodiments, the gasket 15a, 15b comprises rubber, e.g., silicone rubber. In some embodiments, the gasket 15a, 15b is made of EPDM rubber (ethylene propylene diene monomer (M-class) rubber).

A support disc 16 may be disposed adjacent the diaphragm-beam structure. The support disc 16 may mechanically support the diaphragm-beam structure 1. The support disc 16 may mechanically support the frame 2 of the diaphragm-beam structure 1. Compatible materials may be chosen for the diaphragm-beam structure 1 and for the support disc 16. In some embodiments, the support disc 16 and the frame of the diaphragm-beam structure 1 are made of the same materials. In some embodiments, the support disc 16 and the frame of the diaphragm-beam structure 1 are joined by glass frit bonding.

In some embodiments, the support disc 16 is substantially thicker than the frame 2. The frame 2 can, by way of non-limiting example, be less than 250 micrometers thick while the thickness of the support disc 16 can exceed 1 millimeter.

The support disc 16 may provide a bore 17 with suitable dimensions. The bore 17 may provide fluid communication between the port 13a and the portion of the chamber 14a adjacent the paddle of the diaphragm-beam structure 1. In some embodiments, the bore 17 is cylindrical. In some embodiments, the support disc 16 comprises a plurality of (cylindrical) bores. In some embodiments, the support disc 16 comprises a fluid permeable material.

A spacer 18 may be arranged adjacent the support disc 16 and opposite the frame 2. The spacer 18 may be annular. In some embodiments, the annular portion of the spacer 18 is between 0.8 and 2.0 millimeters wide. The outer diameter of the annular portion may range from 16 millimeters to 20 millimeters. The spacer 18 may comprise a polymeric material.

In some embodiments, the spacer 18 comprises side-arms that extend diametrically outward from the spacer. In some embodiments, the spacer 18 comprises four side-arms. The side-arms typically are between 4.0 millimeters and 8.0 millimeters long. The side-arms function to align the spacer 18 inside the housing 12. No side-arms are shown on FIG. 4.

The spacer 18b may include a duct with suitable dimensions. The duct through the spacer 18 may provide fluid communication between the port 13a and the portion of the chamber 14a adjacent the paddle 3 of the diaphragm-beam structure 1. In some embodiments, the duct through the spacer 18b is cylindrical. In some embodiments, a gap along the spacer 18 provides fluid communication. In some embodiments, the spacer 18 comprises a duct and also a gap. In some embodiments, the spacer 18 includes a plurality of gaps and/or ducts. In some embodiments, the spacer 18 comprises a fluid permeable material.

A circuit board 19 may be arranged adjacent the spacer 18 and opposite the support disc 16. In some embodiments, the circuit board 19 comprises a printed circuit board. The (printed) circuit board 19 may house electric and/or electronic components for signal processing. To that end, the circuit board 19 connects to the sensor element 1 via suitable electric connectors such as pin connectors. FIG. 4 shows no pin connectors.

The circuit board 19 may, by way of non-limiting example, be mounted to the housing 12 by means of tie-rods 20*a*, 20*b*. A circuit board 19 of suitable stiffness may mechanically fixate the assembly comprising the circuit board 19, the spacer 18, the support disc 16, etc. In other words, the circuit board 19 secures the assembly 18, 16, 1, 15, by squeezing it against an inner wall of the housing 12.

In some embodiments, the housing 12 includes struts and the circuit board 19 is fixated to these struts. To that end, the housing 12 may, by way of non-limiting example, provide three or four struts. The circuit board 19 may be bolted to the struts of the housing 12. The fixation of the circuit board 19 to the struts entails sufficient pressure to mechanically secure the assembly 18, 16, 1, 15.

Some embodiments may include a diaphragm-beam structure 1 for measuring differential pressure, the diaphragm-beam structure 1 comprising a frame 2, a paddle 3 configured to move from a first position to a second position, and a resilient beam member 4. Some embodiments may include a diaphragm 9 with a first surface and with a second surface opposite the first surface of the diaphragm 9, wherein the diaphragm 9 is configured to flex under application of a pressure on the first surface of the diaphragm 9. A gap 5 is interposed between the at least a paddle 3 and the frame 2. The resilient beam member 4 anchors the paddle 3 to the frame 2. The frame 2, the paddle 3, and the resilient beam member 4 each provide a first surface. The paddle 3 provides a second surface opposite its first surface. The second surface of the diaphragm 9 is mounted to the first surface of the paddle 3 and is flush mounted to (at least a portion of) the first surface of the frame 2 such that the diaphragm 9 bridges the gap 5 between the paddle 3 and the frame 2. The paddle 3 moves from the first position of the paddle 3 to the second position of the paddle 3 due to said flexure of the diaphragm 9 and under application of a pressure on the second surface of the paddle 3. The resilient beam member 4 is configured to bend due to said movement of the paddle 3 thereby generating a strain within the at least a resilient beam member 4, wherein the thickness of the diaphragm 9 between its first surface and its second surface is less than 50 micrometers.

In some embodiments, the diaphragm (9) is flush-mounted to the first surface of the resilient beam member (4).

In some embodiments, the thickness of the diaphragm 9 between its first surface and its second surface is less than 30 micrometers.

In some embodiments, the thickness of the diaphragm 9 between its first surface and its second surface is less than 15 micrometers.

In some embodiments, the second surface of the diaphragm 9 is adhesive.

In some embodiments, a portion of the second surface of the diaphragm 9 is adhesive.

In some embodiments, the gap 5 is an arcuate gap.

In some embodiments, the diaphragm 9 is made of a polymeric material. In some embodiments, the diaphragm 9 contains polymers selected from the group of polyurethanes. In some embodiments, the diaphragm 9 contains polymers selected from the group of polyurethanes.

In some embodiments, the paddle 3 is configured to move from a first position to a second position and vice versa. In some embodiments, the paddle 3 is configured to move from a first position to a second position and to any position between the first position of the paddle 3 and the second position of the paddle 3.

In some embodiments, the thickness of the paddle 3 between its first surface and its second surface is less than 250 micrometers. In some embodiments, the thickness of the at least a paddle 3 between its first surface and its second surface is less than 150 micrometers. In some embodiments, the thickness of the at least a paddle 3 between its first surface and its second surface is 120 micrometers. In some embodiments, the thickness of the at least a paddle 3 between its first surface and its second surface is 100 micrometers.

In some embodiments, the frame 2 comprises a second surface opposite its first surface and wherein the thickness between the first surface of the frame 2 and the second surface of the frame 2 is the same as the thickness between the first surface of the paddle 3 and the second surface of the paddle 3.

In some embodiments, the resilient beam member 4 comprises a second surface opposite its first surface and wherein the thickness between the first surface of the beam member 4 and the second surface of the beam member 4 is the same as the thickness between the first surface of the paddle 3 and the second surface of the paddle 3.

In some embodiments, the sensor element 1 further comprises at least a strain gauge 7*a*-7*d* and wherein the at least a strain gauge 7*a*-7*d* is diffused into and/or implanted into, and/or affixed to the at least a beam member 4 such that the at least a strain gauge 7*a*-7*d* is configured to convert strain within the resilient beam member 4 into an output signal 11 of the strain gauge 7*a*-7*d*.

In some embodiments, the diaphragm-beam structure 1 further comprises at least two bonding wires and each of the at least two bonding wires connects to the at least a strain gauge 7*a*-7*d*.

In some embodiments, the diaphragm-beam structure 1 further comprises a temperature sensor and wherein the temperature sensor is diffused into and/or implanted into, and/or affixed to the beam member 4 such that the temperature sensor is configured to convert the temperature of or near the resilient beam member 4 into an output signal of the temperature sensor.

In some embodiments, the diaphragm-beam structure 1 further comprises a temperature sensor and wherein the temperature sensor is diffused into and/or implanted into, and/or affixed to the frame 2 such that the temperature sensor is configured to convert the temperature of or near the frame 2 into an output signal of the temperature sensor.

In some embodiments, the diaphragm 9 comprises a portion with a bulge and wherein said portion with the bulge is disposed along the gap 5.

In some embodiments, the first surface of the paddle 3 is circular. In some embodiments, the first surface of the at least a paddle 3 is rectangular. In some embodiments, the first surface of the at least a paddle 3 is quadratic. In some embodiments, the first surface of the at least a paddle 3 is triangular.

In some embodiments, the paddle 3 has a diameter along (parallel to) its first surface and said diameter is less than 25 millimeters. In some embodiments, the paddle 3 has a diameter along its first surface and said diameter is less than 20 millimeters. In some embodiments, the paddle 3 has a diameter along its first surface and said diameter is less than 15 millimeters. In some embodiments, the paddle 3 has a diameter along its first surface and said diameter is less than 10 millimeters.

In some embodiments, a differential pressure transducer comprises a housing 12 with first port 13a and with a second port 13b, a first chamber 14a inside the housing 12, and a second chamber 14b inside the housing 12. The pressure transducer further comprises a diaphragm-beam structure 1 according to the instant disclosure. The first chamber 14a is in fluid communication with the first port 13a and the second chamber 14b is in fluid communication with the second port 13b. The sensor element 1 is disposed inside the housing 12 between the first chamber 14a and the second chamber 14b. The diaphragm-beam structure 1 is configured to generate a signal indicative of (proportional to) a differential pressure between a fluid inside the first chamber 14a and a fluid inside the second chamber 14b.

In some embodiments, there is a seal member 15a, 15b. The seal member 15a, 15b seals the first chamber 14a against the second chamber 14b.

In some embodiments, there is a filter arranged inside a port 13a, 13b of the differential pressure transducer. In some embodiments, there are at least two filters, one arranged inside each port 13a, 13b of the differential pressure transducer.

Some embodiments include a circuit for heating, cooling, air-conditioning, and/or ventilation with a differential pressure transducer or a diaphragm-beam structure 1 according to the instant disclosure. In some embodiments, the circuit is a variable air volume system.

In some embodiments, the differential pressure transducer of the instant disclosure is deployed in a fuel cell. In some embodiments, the fluid is gaseous fuel. The pressure transducer in a fuel cell may generate a signal indicative of differential pressure of a gaseous fluid such as differential pressure of gaseous fuel. In some embodiments, the fuel cell is a solid oxide fuel cell. In some embodiments, the fuel cell is a polymer electrolyte fuel cell.

In some embodiments, there is an apparatus with a fuel cell and a differential pressure transducer or a diaphragm-beam structure 1 according to the instant disclosure. The differential pressure transducer is configured to generate a signal indicative of differential pressure of a fluid such as gaseous fuel.

In some embodiments, there is an apparatus with at least a cogeneration plant and a differential pressure transducer or a diaphragm-beam structure 1 according to the instant disclosure. In some embodiments, the at least a differential pressure transducer is configured to generate a signal indicative of differential pressure of a fluid such as gaseous fuel.

In some embodiments, a differential pressure transducer is employed to measure differential pressure of a fluid, in particular of a (combustible) gas and/or of air. This particular type of differential pressure transducer may, by way of non-limiting example, be arranged in a (side channel of) a Venturi tube and/or in a Venturi burner. The differential pressure transducer may be employed to regulate and/or (PID) control parameters of the burner such as the speed of a blower and/or gas/air ratios and/or valve positions.

It should be understood that the foregoing relates only to certain embodiments and that numerous changes may be made therein without departing the scope of the invention as defined by the following claims. It should also be understood that the teachings herein are not restricted to the illustrated embodiments and that various modifications can be made within the scope of the following claims.

REFERENCE NUMERALS 1 diaphragm-beam structure
2 frame
3 paddle
4 beam member
5 gap
6 line
7a-7d strain gauges
8 line
9 diaphragm
10a, 10b terminals of a bridge circuit
11 electric output signal
12 container
13a, 13b ports
14a, 14b chambers
15a, 15b gasket
16 support disc
17 bore
18a, 18b spacer (with duct)
19 circuit board
20a, 20b tie-rods

The invention claimed is:

1. A diaphragm-beam structure for measuring differential pressure, the diaphragm-beam structure comprising:
a frame;
a paddle configured to move from a first position to a second position;
a resilient beam member;
a diaphragm with a first surface and a second surface opposite the first surface of the diaphragm; and
a gap defined between the paddle and the frame;
wherein the diaphragm flexes under application of a pressure on the first surface of the diaphragm;
wherein the resilient beam member anchors the paddle to the frame;
the frame, the paddle, and the resilient beam member each include a respective first surface;
the paddle includes a second surface opposite its first surface;
the second surface of the diaphragm is mounted to the first surface of the paddle and flush mounted to at least a portion of the first surface of the frame such that the diaphragm bridges the gap between the paddle and the frame, wherein the diaphragm extends over a full extent of the first surface of the paddle and a full extent of the gap;
the paddle moves from the first position to the second position due to said flexure of the diaphragm under application of a pressure on the second surface of the paddle;
the resilient beam member bends due to said movement of the paddle thereby generating a strain within the resilient beam member; and
a thickness of the diaphragm between its first surface and its second surface is less than 50 micrometers.

2. The diaphragm-beam structure according to claim 1, wherein the thickness of the diaphragm between its first surface and its second surface is less than 30 micrometers.

3. The diaphragm-beam structure according to claim 1, wherein the diaphragm comprises a polymeric material.

4. The diaphragm-beam structure according to claim 1, wherein the diaphragm comprises polyurethanes.

5. The diaphragm-beam structure according to claim 1, wherein a thickness of the paddle between its first surface and its second surface is less than 250 micrometers.

6. The diaphragm-beam structure according to claim 1, wherein the frame comprises a second surface opposite its first surface; and a thickness between the first surface of the frame and the second surface of the frame is the same as the thickness between the first surface of the paddle and the second surface of the paddle.

7. The diaphragm-beam structure according to claim 1, wherein the resilient beam member comprises a second surface opposite its first surface and a thickness between the first surface of the beam member and the second surface of the beam member is the same as the thickness between the first surface of the paddle and the second surface of the paddle.

8. The diaphragm-beam structure according to claim 1, further comprising a strain gauge diffused into, or implanted into, or affixed to, the beam member such that the strain gauge converts strain within the resilient beam member into an output signal of the strain gauge.

9. The diaphragm-beam structure according to claim 8, further comprising at least two bonding wires;
wherein each of the at least two bonding wires connects to the strain gauge.

10. The diaphragm-beam structure according to claim 1, wherein the diaphragm comprises a bulge and wherein said bulge is disposed along the gap.

11. The diaphragm-beam structure according to claim 1, wherein the first surface of the paddle is circular.

12. The diaphragm-beam structure according to claim 1, wherein the paddle has a diameter along its first surface and said diameter is less than 25 millimeters.

13. A pressure transducer comprising:
a housing with first port and a second port;
a first chamber inside the housing;
a second chamber inside the housing; and
a diaphragm-beam structure comprising:
  a frame;
  a paddle configured to move from a first position to a second position;
  a resilient beam member;
  a diaphragm with a first surface and a second surface opposite the first surface of the diaphragm; and
  a gap defined between the paddle and the frame;
  wherein the diaphragm flexes under application of a pressure on the first surface of the diaphragm;
  wherein the resilient beam member anchors the paddle to the frame;
  the frame, the paddle, and the resilient beam member each include a respective first surface;
  the paddle includes a second surface opposite its first surface;
  the second surface of the diaphragm is mounted to the first surface of the paddle and flush mounted to at least a portion of the first surface of the frame such that the diaphragm bridges the gap between the paddle and the frame, wherein the diaphragm extends over a full extent of the first surface of the paddle and a full extent of the gap;
  the paddle moves from the first position to the second position due to said flexure of the diaphragm under application of a pressure on the second surface of the paddle;
  the resilient beam member bends due to said movement of the paddle thereby generating a strain within the resilient beam member; and
  a thickness of the diaphragm between its first surface and its second surface is less than 50 micrometers;
  wherein the first chamber is in fluid communication with the first port and the second chamber is in fluid communication with the second port;
  the sensor element is disposed inside the housing between the first chamber and the second chamber; and
  the diaphragm-beam structure generates a signal indicative of a differential pressure between a first fluid inside the first chamber and a second fluid inside the second chamber.

14. A circuit for heating, cooling, air-conditioning and/or ventilation comprising at least one pressure transducer according to claim 13.

15. The circuit for heating, cooling, air-conditioning and/or ventilation of claim 14, wherein the circuit comprises a variable air volume system.

\* \* \* \* \*